United States Patent
Sadovitch et al.

(10) Patent No.: US 11,915,340 B2
(45) Date of Patent: Feb. 27, 2024

(54) GENERATING A DISPLAY OF AN AUGMENTED REALITY HEAD-UP DISPLAY FOR A MOTOR VEHICLE

(71) Applicant: Volkswagen Aktiengesellschaft, Wolfsburg (DE)

(72) Inventors: Vitalij Sadovitch, Braunschweig (DE); Ulrich Wuttke, Braunschweig (DE); Nina Jellentrup, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 159 days.

(21) Appl. No.: 17/637,213

(22) PCT Filed: Jul. 14, 2020

(86) PCT No.: PCT/EP2020/069921
§ 371 (c)(1),
(2) Date: Feb. 22, 2022

(87) PCT Pub. No.: WO2021/032368
PCT Pub. Date: Feb. 25, 2021

(65) Prior Publication Data
US 2022/0301234 A1  Sep. 22, 2022

(30) Foreign Application Priority Data
Aug. 22, 2019 (DE) ............. 10 2019 212 601.4

(51) Int. Cl.
*G06T 11/00* (2006.01)
*B60K 35/00* (2006.01)

(52) U.S. Cl.
CPC ............. *G06T 11/00* (2013.01); *B60K 35/00* (2013.01); *B60K 2370/1529* (2019.05);
(Continued)

(58) Field of Classification Search
CPC . G06T 11/00; B60K 35/00; B60K 2370/1529; B60K 2370/1876; B60K 2370/177; B60K 2370/166
(Continued)

(56) References Cited

U.S. PATENT DOCUMENTS 8,212,662 B2   7/2012  Sasaki et al. ............. 340/438
11,333,521 B2 *  5/2022  Yamaguchi ............. B60R 1/00
(Continued)

FOREIGN PATENT DOCUMENTS

DE   102011084217 A1   4/2013  ............. H02M 1/00
DE   102012216144 A1   5/2014  ............. G01C 21/36
(Continued)

OTHER PUBLICATIONS

DE 102011084217 A1, US 2014/0257635 A1.
(Continued)

*Primary Examiner* — Jacinta M Crawford
(74) *Attorney, Agent, or Firm* — Slayden Grubert Beard PLLC

(57) ABSTRACT

The present invention relates to a method, a computer program with instructions, and a device for generating a display of an augmented reality head-up display for a motor vehicle. In a first step, a position of the motor vehicle is determined. A plurality of virtual elements for a navigation hint is then provided on the basis of the position of the motor vehicle. The virtual elements, as seen from the motor vehicle, extend on both sides in a lateral direction to outside a field of view of the augmented reality head-up display. Finally, at least that virtual element which has the shortest distance to a center of the field of view is rendered.

20 Claims, 7 Drawing Sheets

(52) U.S. Cl.
CPC .. *B60K 2370/166* (2019.05); *B60K 2370/177* (2019.05); *B60K 2370/1876* (2019.05)

(58) Field of Classification Search
USPC .......................................................... 345/633
See application file for complete search history.

(56) References Cited

U.S. PATENT DOCUMENTS

| | | | |
|---|---|---|---|
| 2014/0257635 A1 | 9/2014 | Haubenschild | 701/36 |
| 2015/0185039 A1 | 7/2015 | Milicic et al. | 701/437 |
| 2016/0327402 A1 | 11/2016 | Funabiki et al. | 701/431 |
| 2017/0136878 A1 | 5/2017 | Frank et al. | 345/619 |
| 2020/0376961 A1 | 12/2020 | Kleen et al. | |
| 2021/0407046 A1* | 12/2021 | Kopff | G06T 5/001 |

FOREIGN PATENT DOCUMENTS

| | | | | |
|---|---|---|---|---|
| DE | 102014200407 A1 | 7/2015 | ............. | B60K 35/00 |
| DE | 102015006640 A1 | 3/2016 | ............. | B60K 21/36 |
| DE | 102015225343 A1 | 6/2017 | ............. | B60K 35/00 |
| DE | 102016203080 A1 | 8/2017 | ............. | B60W 30/08 |
| DE | 102017221488 A1 | 6/2019 | ............. | B60K 35/00 |
| DE | 102019212601 A1 | 2/2021 | ............. | G01C 21/36 |
| EP | 3031656 B1 | 1/2018 | ............. | B60K 35/00 |
| EP | 2899506 B1 | 7/2018 | ............. | G01C 21/36 |
| WO | 2016/000814 A1 | 1/2016 | ............. | B60K 35/00 |
| WO | 2021/032368 A1 | 2/2021 | ............. | B60K 35/00 |

OTHER PUBLICATIONS

DE 102012216144 A1, US 2015/0185039 A1.
WO 2016/000814 A1, US 2017/0136878 A1.
DE 102017221488 A1, US 2020/0376961 A1.
German Office Action, Application No. 102019212601.4, 6 pages, dated Jul. 2, 2020.
International Search Report and Written Opinion, Application No. PCT/EP2020/069921, 7 pages, dated Oct. 27, 2020.

* cited by examiner

GENERATING A DISPLAY OF AN AUGMENTED REALITY HEAD-UP DISPLAY FOR A MOTOR VEHICLE

CROSS-REFERENCE TO RELATED APPLICATIONS

This application claims priority to German Patent Application No. DE 10 2019 212 601.4, filed Aug. 22, 2019 with the German Patent and Trademark Office. The contents of the aforesaid Patent Application are incorporated herein for all purposes.

TECHNICAL FIELD

The present invention relates to a method, a computer program with instructions, and a device for generating a display of an augmented reality head-up display for a motor vehicle. The invention further relates to a motor vehicle in which a method or apparatus according to the invention is used.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

As virtual and augmented reality technologies and applications continue to evolve, they are also finding their way into the automobile. Augmented reality (AR) is the enrichment of the real world with virtual elements that are registered in three-dimensional space and allow real-time interaction. The term "mixed reality" is also used synonymously.

One possible technical implementation for enriching the driver's cockpit with perspective-correct virtual extensions is the head-up display (HUD). The light beams of a display installed in the dashboard are folded via several mirrors and lenses and reflected into the driver's eye via a projection surface, so that the driver perceives a virtual image outside the vehicle. In the automotive sector, the projection surface is often the windshield, whose curved shape must be taken into account in the display. As an alternative, an additional pane of glass or plastic is sometimes used, which is placed on the dashboard between the driver and the windshield. The optical overlay of the display and the driving scene means that fewer head and eye movements are required to read the information. In addition, the adaptation effort for the eyes is reduced because, depending on the virtual distance of the display, less or no accommodation is required.

Augmented reality offers a wide range of possible applications for supporting the driver by means of contact-analog marking of roadways and objects. Relatively obvious examples mostly relate to the field of navigation. While classic navigation displays in conventional head-up displays usually show schematic representations, e.g. a right-angled arrow pointing to the right as a sign to turn right at the next opportunity, AR displays offer much more effective possibilities. Since the displays can be shown as "part of the environment," navigation hints or hazard warnings, for example, can be presented to the driver very effectively directly at the real reference location.

Registering virtual information in the driver's real field of vision places very high demands on technical implementation. In order to be able to display virtual content in reality with location accuracy and correct perspective, very detailed knowledge of the environment and the vehicle's own motion is required. To ensure that the virtual overlay is correctly positioned in perspective for the driver, it must be positioned and aligned in three-dimensional space in relation to the position of the vehicle. For this purpose, it is necessary to locate the vehicle with an accuracy of a few centimeters. Even with differential GPS systems, however, an accuracy of only about 2 m can be achieved. With the help of a sensor fusion, for example from GPS and camera data with e.g. road markings, the precision can be increased. However, display errors due to inaccuracies cannot be ruled out. For example, an erroneous position determination can lead to navigation hints being displayed at an implausible location.

The display area of a head-up display in which the display of virtual content in the windshield is possible is described by the field of view (FOV). The field of view indicates the extent of the virtual image in horizontal and vertical directions in angular degrees and is essentially limited by the available installation space in the vehicle. With conventional technology, a field of view of about 10×4 is feasible. If the position is incorrectly determined, the navigation information to be displayed may lie outside the field of view of the augmented reality head-up display and thus cannot be shown at all.

SUMMARY

A need exists for providing solutions for generating a display of an augmented reality head-up display for a motor vehicle that enable a reduction of display errors.

The need is addressed by a method, by a computer program with instructions, and by a device with the features of the independent claims. Embodiments of the invention are described in the dependent claims, the following description, and the drawings.

DESCRIPTION

Figure 1:
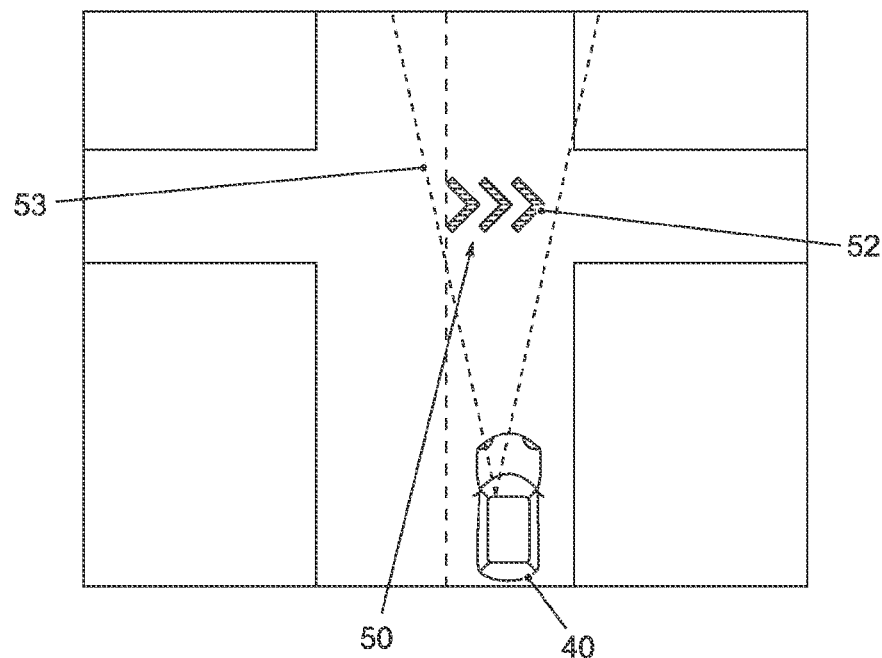
FIG. 1 shows an exemplary contact-analog navigation hint when a motor vehicle approaches a junction.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a method for generating a display of an augmented reality head-up display for a motor vehicle comprises the steps of:
  determining a position of the motor vehicle;
  providing a plurality of virtual elements for a navigation hint on the basis of the position of the motor vehicle, wherein the virtual elements, as seen from the motor vehicle, extend on both sides in a lateral direction to outside a field of view of the augmented reality head-up display, and
  rendering at least the virtual element that has the shortest distance to a center of the field of view.

In some embodiments, a computer program includes instructions that, when executed by a computer, cause the computer to perform the following steps for generating a display of an augmented reality head-up display for a motor vehicle:
  determining a position of the motor vehicle;
  providing a plurality of virtual elements for a navigation hint on the basis of the position of the motor vehicle, wherein the virtual elements, as seen from the motor vehicle, extend on both sides in a lateral direction to outside a field of view of the augmented reality head-up display, and
  rendering at least the virtual element that has the shortest distance to a center of the field of view.

The term computer is to be understood broadly. In particular, it also includes control units and other processor-based data processing devices.

For example, the computer program may be provided for electronic retrieval or be stored on a computer-readable storage medium.

In some embodiments, a device for generating a display of an augmented reality head-up display for a motor vehicle comprises:
  a position determination module for determining a position of the motor vehicle; and
  a graphics module for generating a plurality of virtual elements for a navigation hint on the basis of the position of the motor vehicle, wherein the virtual elements, as seen from the motor vehicle, extend on both sides in a lateral direction to outside a field of view of the augmented reality head-up display, and for rendering at least that virtual element which has the shortest distance to a center of the field of view.

To solve the described problem, a virtual extension of the display elements in the transverse direction is used. The additional virtual elements make it possible to compensate for occurring position inaccuracies. The additional elements are not rendered in the normal case and are therefore not represented by the augmented reality head-up display. In the first frame, however, at least the virtual element with the shortest distance to the center of the display area is rendered. In this way, the rendered element is arranged as centrally as possible in the field of view and is thus easily perceptible for the driver. Regardless of the correctness of the position of the motor vehicle detected by sensors, a correctly located navigation hint is always displayed by the augmented reality head-up display. The virtual extension of the display elements in the transverse direction also ensures, in the case of a non-orthogonal approach to a turn-off point, that virtual elements are located in the field of view and can be displayed as rendered elements in the augmented reality head-up display. The higher the number of virtual elements or the larger the area in which additional virtual elements are located, the lower the probability that the navigation hints cannot be displayed due to an existing location error.

In some embodiments, virtual elements adjacent to the virtual element with the shortest distance to the center of the field of view are additionally rendered. Rendering additional elements adjacent to the central element allows navigation hints to be composed of multiple elements, e.g., three contiguous arrows. Since it may happen in this context that virtual elements are only partially in the field of view, it is useful to specify how to deal with such virtual elements. In a first embodiment, for a virtual element that is only partially in the field of view of the augmented reality head-up display, only the part of the virtual element that is located within the field of view is rendered. In contrast, in a second embodiment, only virtual elements that are completely located within the field of view of the augmented reality head-up display are rendered. For example, the user of the augmented reality head-up display can specify the manner in which the display is to be performed.

In some embodiments, the virtual elements are rendered with decreasing brightness starting from the center of the field of view towards edges of the field of view. This type of rendering simulates fading of the navigation hint towards the edges of the field of view. Especially for elements that are only partially rendered, this ensures that there are no annoying breaks in the display at the edges of the field of view.

In some embodiments, the virtual elements to be rendered are adjusted when a steering angle of the motor vehicle exceeds a threshold value when the position of the motor vehicle is changed. This measure solves the problem that, as a result of the steering intervention, the initially determined elements move out of the field of view due to the movement of the motor vehicle. Since the same steering angle causes a larger relative position change at a far distance to the virtual elements than at a close distance, the threshold value for the steering angle for example depends on a distance between the motor vehicle and a display location for the navigation hint. This can prevent the elements from wandering back and forth erratically.

In some embodiments, the virtual elements to be rendered are adjusted if, when the position of the motor vehicle is changed, at least one element already rendered is no longer located in a predetermined area of the field of view. In this embodiment, a check is made at each frame to determine whether the elements initially specified for the rendering are still located in a specified area of the field of view. If there are large lateral changes in the position of the vehicle, the objects move out of this area. If the area is selected so as to be smaller than the entire field of view, this is an indication that the elements will soon move out of the field of view if the position change continues. This information is used to render the next virtual elements that will foreseeably move into the field of view. This ensures that, whenever an element threatens to move out of the field of view, another virtual element is added to compensate for the vehicle movements.

Particularly beneficially, a method or device according to the teachings herein is used in a vehicle, in particular a motor vehicle.

Further features of the present invention will become apparent from the appended claims and from the following description in conjunction with the FIGS. Specific references to components, process steps, and other elements are not intended to be limiting. Further, it is understood that like parts bear the same or similar reference numerals when referring to alternate FIGS.

For a better understanding of the principles of the present invention, further embodiments will be explained in more detail below with reference to the FIGS. It is understood that the invention is not limited to these embodiments and that the features described may also be combined or modified without departing from the scope as defined in the appended claims.

FIG. 1 shows a contact-analog navigation hint 50 as a motor vehicle 40 approaches a junction. An exemplary turn-off scenario from a bird's eye view is shown. In the ideal condition shown in FIG. 1, an augmented reality head-up display shows a navigation hint 50 that appears to be in the right lane and points to a right turn.

The navigation hint 50 is composed of three rendered elements 52 that are entirely located within the field of view 53 of the augmented reality head-up display.

Figure 2:
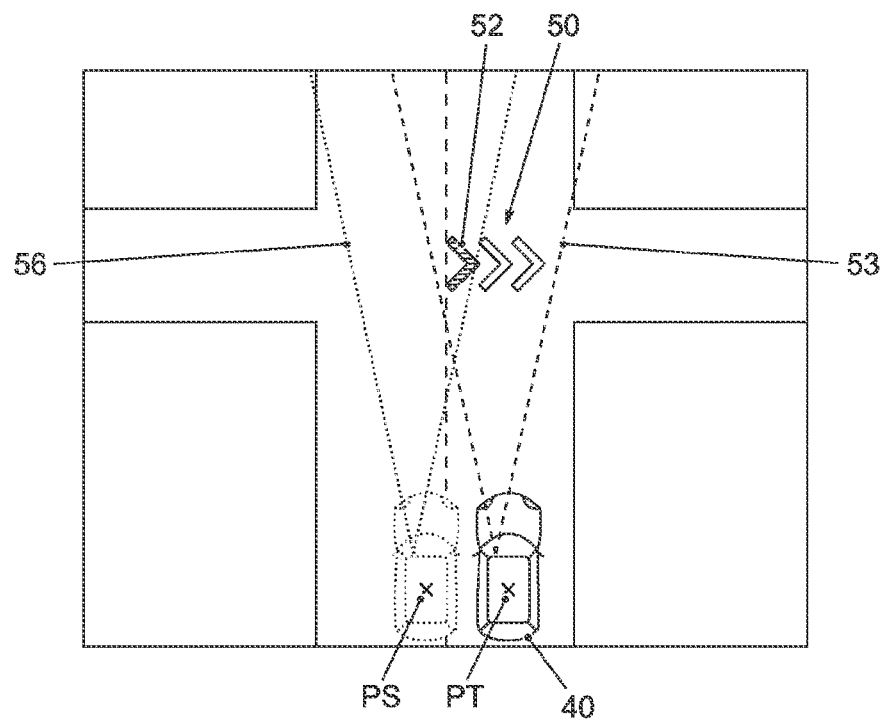
FIG. 2 shows an exemplary contact-analog navigation hint when a motor vehicle approaches a junction in the event of a lateral positioning error.

FIG. 2 shows a contact-analog navigation hint 50 when a motor vehicle 40 approaches a junction in event of a lateral positioning error, i.e., a positioning error transverse to the direction of travel. Due to the positioning error, the actual position PT of the motor vehicle 40 deviates from the sensor-determined position PS of the motor vehicle 40. This results in the augmentation generated on the basis of the sensor-determined position PS being virtually located outside the supposed field of view 56, which is also based on the sensor-determined position PS, and thus not being displayed or only being partially displayed, although it is actually completely located within the actual field of view 53. In the example shown, only a single rendered element 52 is displayed.

Figure 3:
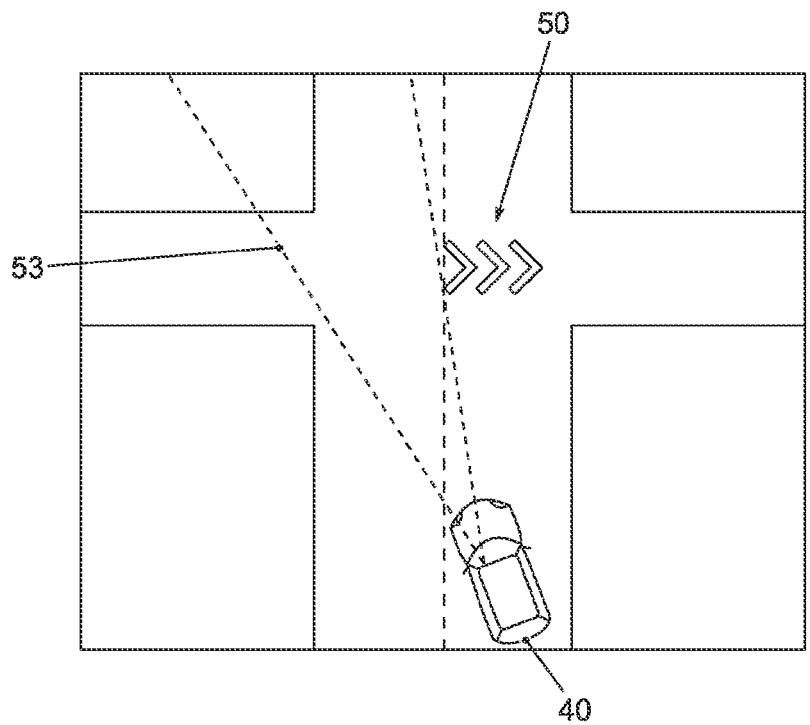
FIG. 3 shows an exemplary contact-analog navigation hint for a non-orthogonal approach of a motor vehicle to a junction.

FIG. 3 illustrates a contact-analog navigation hint 50 during a non-orthogonal approach of a motor vehicle 40 to a junction. As can be seen in FIG. 3, in addition to positioning errors, a non-orthogonal approach to the turn-off point can also result in the augmentation being virtually located outside the field of view 53 and thus not being displayed or only being partially displayed. In the example shown, the navigation hint 50 to be displayed is located completely outside the field of view 53, so that not a single rendered element is displayed.

Figure 4:
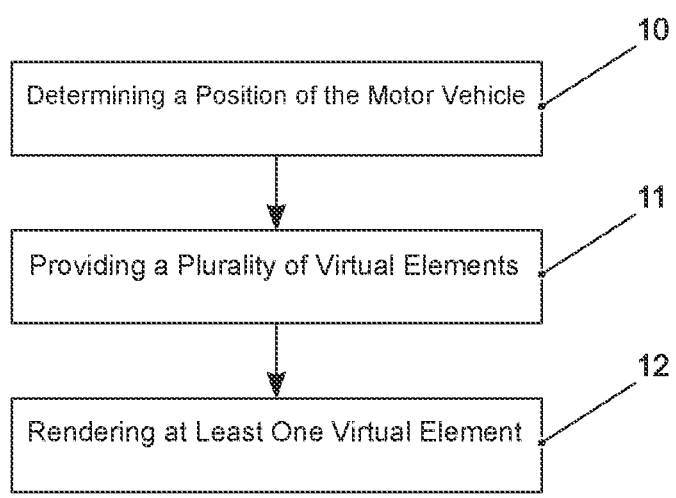
FIG. 4 schematically shows an exemplary method for generating a display of an augmented reality head-up display for a motor vehicle.

FIG. 4 schematically shows a method for generating a display of an augmented reality head-up display for a motor vehicle. In a first step, a position of the motor vehicle is determined 10. On the basis of the position of the motor vehicle, a plurality of virtual elements for a navigation hint is then provided 11. The virtual elements, as seen from the motor vehicle, extend on both sides in a lateral direction to outside a field of view of the augmented reality head-up display. Finally, at least that virtual element which has the shortest distance to a center of the field of view is rendered 12. Additionally, virtual elements that are adjacent to this central virtual element may be rendered 12. In this regard, it may be provided that, for a virtual element that is only partially located within the field of view of the augmented reality head-up display, only the portion of the virtual element that is located within the field of view is rendered. Alternatively, only virtual elements that are completely located within the field of view of the augmented reality head-up display are rendered. In either case, the virtual elements may be rendered starting from the center of the field of view towards edges of the field of view with decreasing brightness. For example, the virtual elements to be rendered are adjusted when a steering angle of the motor vehicle exceeds a threshold value when the position of the motor vehicle is changed. The threshold value for the steering angle may depend on a distance between the motor vehicle and a display location for the navigation hint. Alternatively, the virtual elements to be rendered can be adjusted if, when the position of the motor vehicle changes, at least one element that has already been rendered is no longer located within a predetermined area of the field of view.

Figure 5:
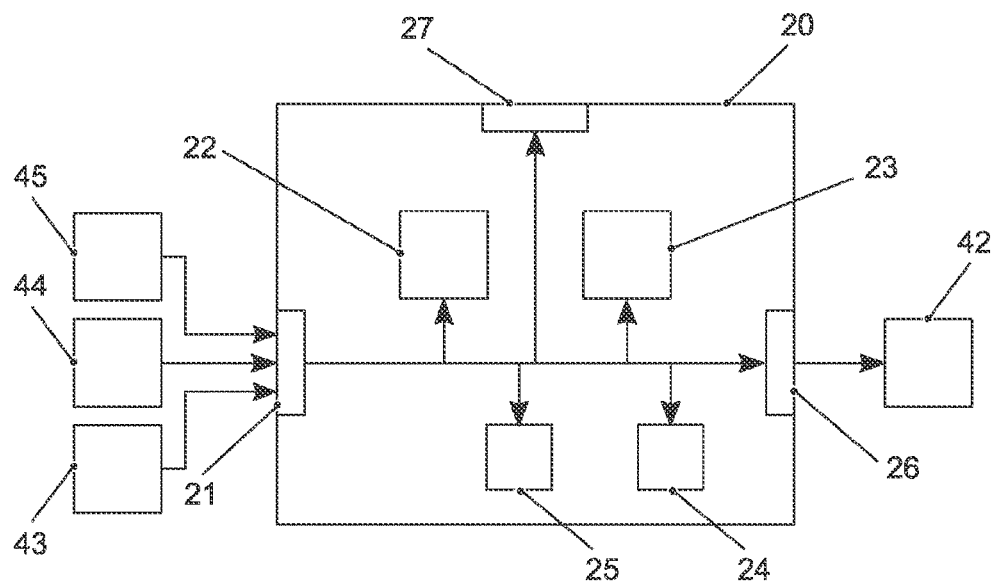
FIG. 5 shows a first embodiment of a device for generating a display of an augmented reality head-up display for a motor vehicle.

FIG. 5 shows a simplified schematic representation of a first embodiment of a device 20 for generating a display of an augmented reality head-up display for a motor vehicle. The device 20 has an input 21 via which, for example, image data from a camera 43, data from a sensor system 44 or data from a navigation system 45 can be received. The sensor system 44 may include, for example, a laser scanner or a stereo camera for detecting objects in an environment of the motor vehicle. The device 20 also has a position determination module 22, which determines a position of the motor vehicle on the basis of the received data. On the basis of this position, a graphics module 23 first generates a plurality of virtual elements for a navigation hint. The virtual elements, as seen from the motor vehicle, extend on both sides in a lateral direction to outside a field of view of the augmented reality head-up display. The graphics module 23 then renders at least the virtual element that is the shortest distance to a center of the field of view. Additionally, the graphics module 23 may render virtual elements that are adjacent to this central virtual element. In this regard, it may be provided that, for a virtual element that is only partially located within the field of view of the augmented reality head-up display, only the portion of the virtual element that is located within the field of view is rendered. Alternatively, only virtual elements that are completely located within the field of view of the augmented reality head-up display are rendered. In either case, the virtual elements may be rendered starting from the center of the field of view towards edges of the field of view with decreasing brightness. For example, the virtual elements to be rendered are adjusted when a steering angle of the motor vehicle exceeds a threshold value when a change in the position of the motor vehicle is detected by the position determination module 22. The threshold value for the steering angle may depend on a distance between the motor vehicle and a display location for the navigation hint. Alternatively, the virtual elements to be rendered can be adjusted if, when the position of the motor vehicle changes, at least one element that has already been rendered is no longer located within a predetermined area of the field of view.

The position determination module 22 and the graphics module 23 can be controlled by a control unit 24. If necessary, settings of the position determination module 22, the graphics module 23 or the control unit 24 can be changed via a user interface 27. The data generated in the device 20 can be stored in a memory 25 of the device 20 if required, for example for later evaluation or for use by the components of the device 20. The position determination module 22, the graphics module 23 and the control unit 24 may be implemented as dedicated hardware, for example as integrated circuits. Of course, they may also be partially or fully combined or implemented as software running on a suitable processor, for example a GPU. The input 21 and the output 26 may be implemented as separate interfaces or as a combined bidirectional interface. In the example described, the device 20 is a stand-alone component. However, it may equally be integrated in the control unit 42 of the augmented reality head-up display device.

Figure 6:
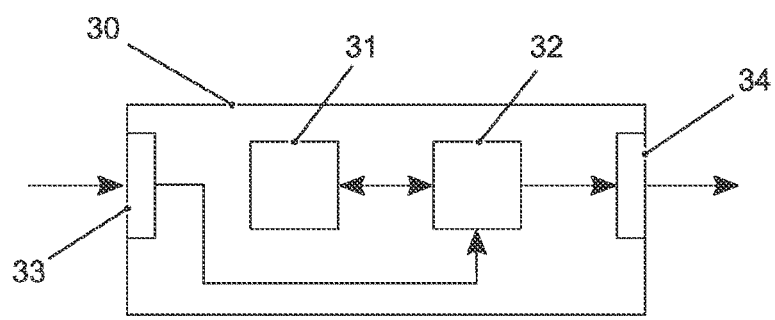
FIG. 6 shows a second embodiment of a device for generating a display of an augmented reality head-up display.

FIG. 6 shows a simplified schematic representation of a second embodiment of a device 30 for generating a display of an augmented reality head-up display for a motor vehicle. The device 30 includes a processor 32 and a memory 31. For example, the device 30 is a computer or a control unit. The memory 31 stores instructions that, when executed by the processor 32, cause the device 30 to perform the steps according to one of the described methods. The instructions stored in the memory 31 thus embody a program executable by the processor 32 which implements the method according to some embodiments. The device 30 has an input 33 for receiving information, for example navigation data or data on an environment of the motor vehicle. Data generated by the processor 32 is provided via an output 34. In addition, they may be stored in the memory 31. The input 33 and the output 34 may be combined to form a bidirectional interface.

The processor 32 may include one or more processing units, such as microprocessors, digital signal processors, or combinations thereof.

The memories 25, 31 of the described embodiments may have both volatile and non-volatile memory regions and may comprise a wide variety of storage devices and storage media, for example hard disks, optical storage media, or semiconductor memories.

Figure 7:
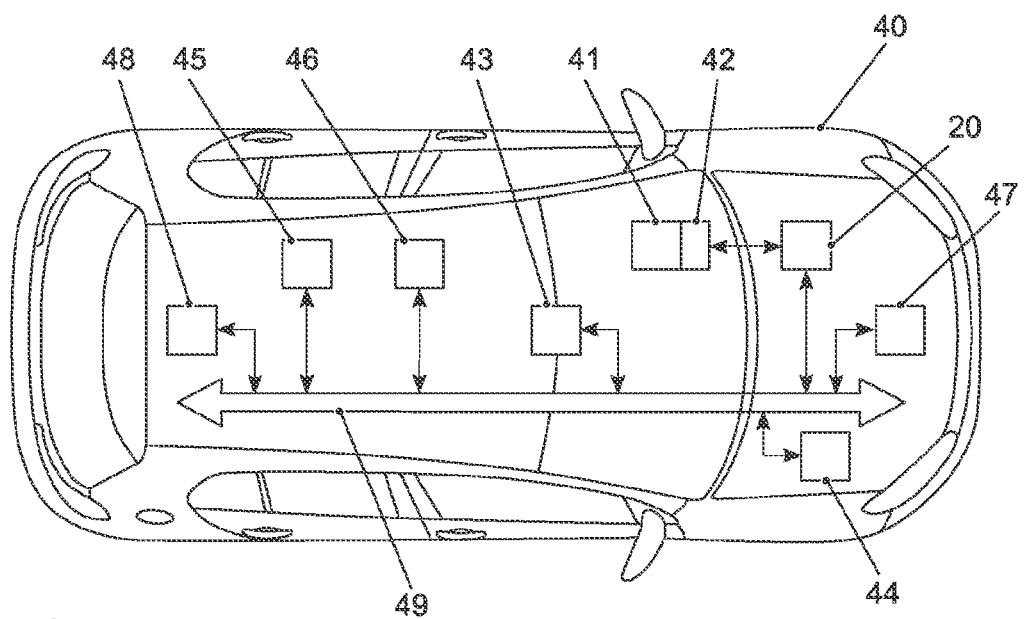
FIG. 7 schematically illustrates a motor vehicle in which an embodiment is implemented.

FIG. 7 schematically depicts a motor vehicle 40 in which a solution is implemented. The motor vehicle 40 has an augmented reality head-up display 41 with an associated control unit 42. Furthermore, the motor vehicle 40 comprises a device 20 for generating a display of the augmented reality head-up display 41. The device 20 may, of course, be integrated into the augmented reality head-up display 41 or into the control unit 42 of the augmented reality head-up display 41. Further components of the motor vehicle 40 include a camera 43 and a sensor system 44 for detecting objects, a navigation system 45, a data transmission unit 46, and a number of assistance systems 47, one of which is shown by way of example. By means of the data transmission unit 46, a connection to service providers can be established, for example for retrieving map data. A memory 48 is provided for storing data. Data is exchanged between the various components of the motor vehicle 40 via a network 49.

Figure 8:
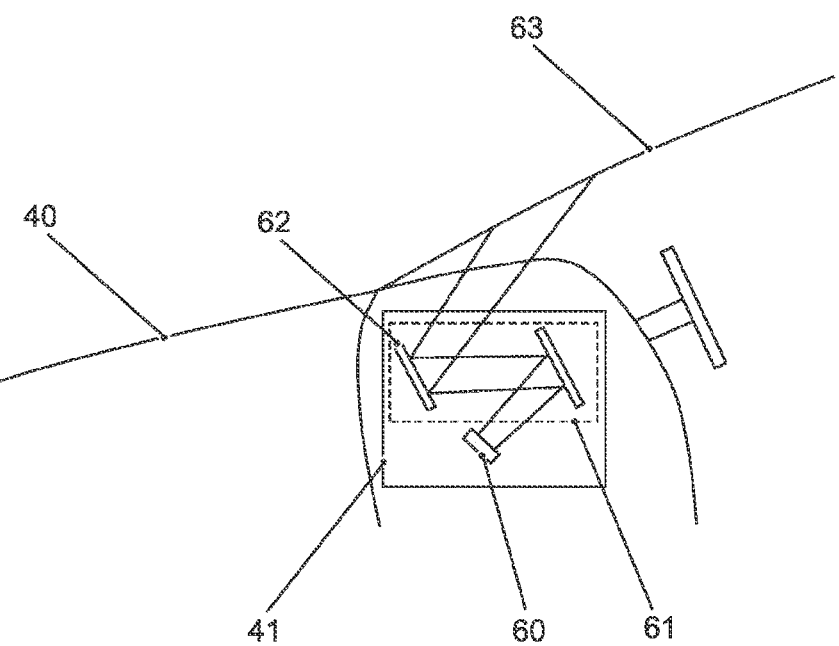
FIG. 8 shows an exemplary schematic diagram of the general structure of an augmented reality head-up display for a motor vehicle.

FIG. 8 schematically shows an augmented reality head-up display 41 for a motor vehicle 40, with the aid of which content can be displayed on a projection surface 63 of the motor vehicle 40, for example on the windshield or on an additional pane of glass or plastic arranged on the dashboard between the driver and the windshield. The displayed content is generated by an imaging unit 60 and projected onto the projection surface 63 by means of an optical module 61. Typically, the projection takes place in an area of the windshield above the steering wheel. By means of an optical component 62 of the optical module 61, the position of an eyebox of the augmented reality head-up display 41 can be adjusted. The imaging unit 60 may be an LCD TFT display, for example. The augmented reality head-up display 41 is usually installed in a dashboard of the motor vehicle 40.

In the following, embodiments will be described with reference to FIG. 9 to FIG. 14. In this context, the solution is explained using the example of a display of navigation hints consisting of three contiguous arrows. Of course, the solution is not limited to this embodiment.

Figure 9:
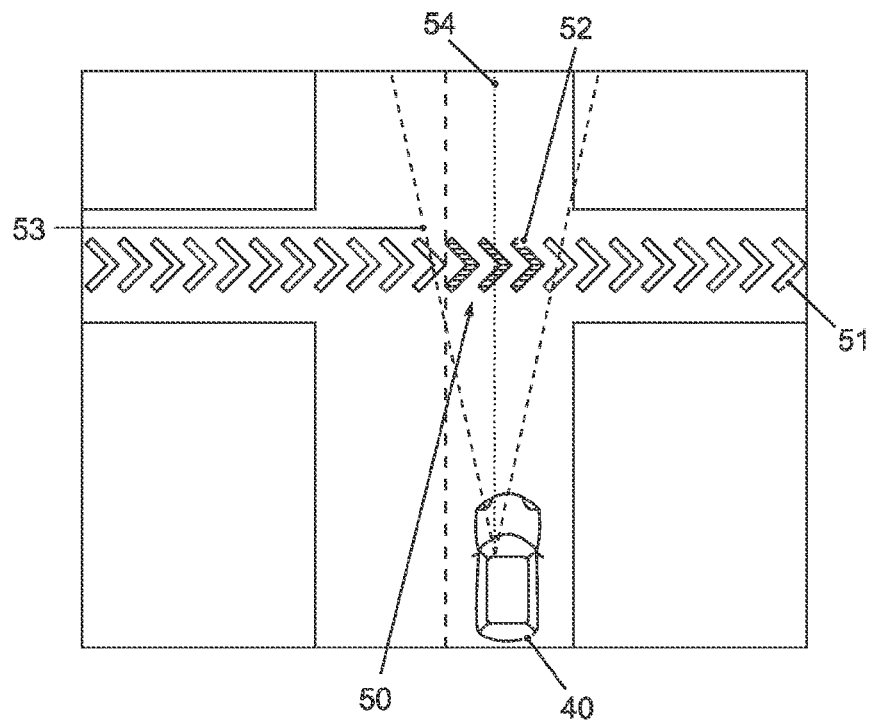
FIG. 9 shows an exemplary contact-analog navigation hint generated with an embodiment when a motor vehicle approaches a junction.

FIG. 9 shows a contact-analog navigation hint 50 generated by a method according to some embodiments when a motor vehicle approaches a junction. To prevent the display errors that occur due to lateral position inaccuracies, a virtual extension of the display elements in the transverse direction is performed. In the concrete example, additional virtual elements 51 are added to the three arrows in the virtual scene. However, the additional virtual elements 51 are not rendered in the normal case and are therefore not represented by the augmented reality head-up display. In the first frame to be displayed, at least the element with the shortest distance to the center of the display area or to the center 54 of the field of view 53 is rendered. Optionally, a defined number of further elements can be rendered to either side. In FIG. 9, for example, one further element is rendered to the left and one to the right of the central element, so that the navigation hint 50 is composed of three rendered elements 52.

Figure 10:
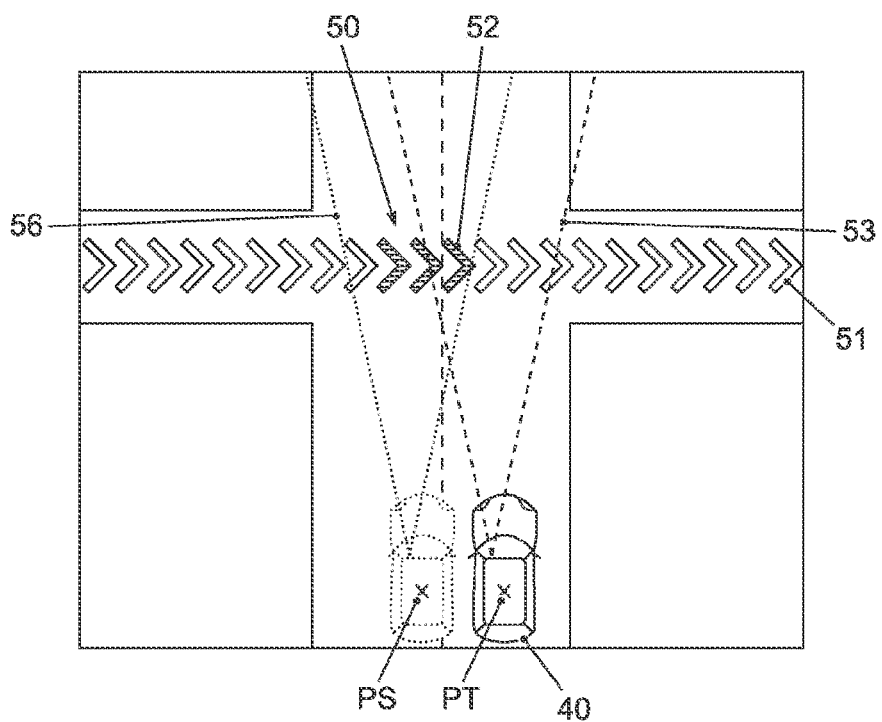
FIG. 10 shows an exemplary contact-analog navigation hint generated with an embodiment when a motor vehicle approaches a junction in the event of a lateral positioning error.

FIG. 10 shows a contact-analog navigation hint 50 generated by a method according to some embodiments when a motor vehicle 40 approaches a junction in the event of a lateral positioning error. The virtual extension of the display elements in the lateral direction ensures that correctly located navigation hints 50 can always be displayed in the augmented reality head-up display, irrespective of the correctness of the sensor-detected position PS of the motor vehicle with respect to the actual position PT of the motor vehicle 40. Since the virtual elements 51 also extend into the supposed field of view 56 determined on the basis of the sensor-detected position PS, the navigation hint 50 can be composed of three rendered elements 52 as desired.

Figure 11:
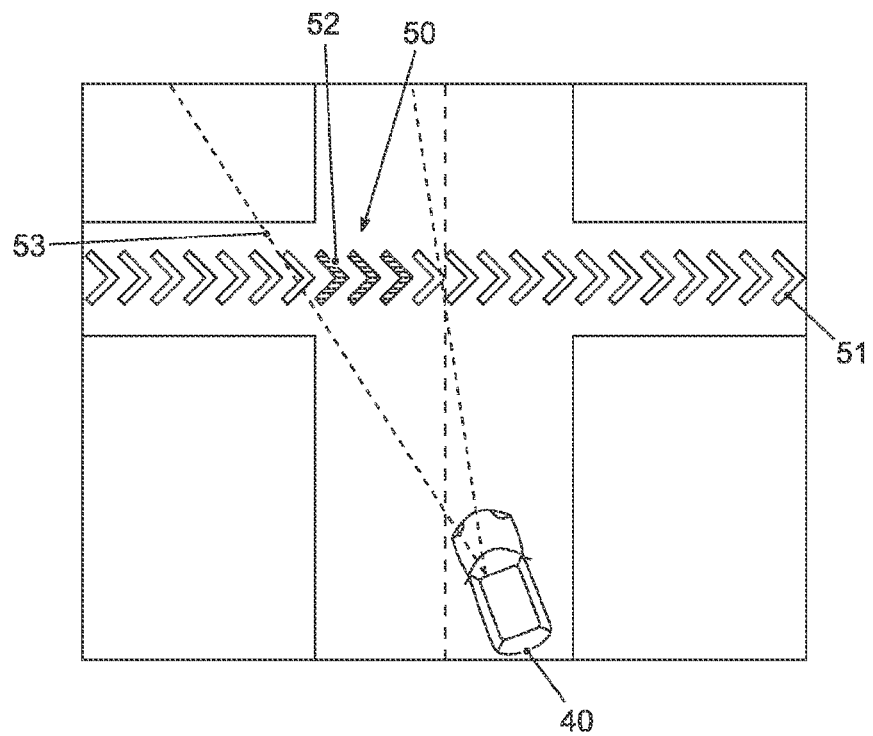
FIG. 11 shows a contact-analog navigation hint generated with an embodiment during a non-orthogonal approach of a motor vehicle to a junction.

FIG. 11 shows a contact-analog navigation hint generated with a method according to some embodiments when a motor vehicle approaches a junction in the event of a deviating orientation of the motor vehicle. The virtual extension of the display elements in the transverse direction also ensures in this case that virtual elements 51 are located in the field of view 53 and can be displayed as rendered elements 52 in the augmented reality head-up display.

The higher the number of virtual elements, or the larger the area in which additional virtual elements are located, the lower the probability that the navigation hints cannot be displayed due to an existing location error.

The effect achieved by the solution described is comparable to that of a flashlight whose light cone illuminates the virtual elements in the central area of the field of view so that they become visible due to a reflection of the light. The other virtual elements outside the light cone, on the other hand, do not emit any light and are therefore not visible.

For the implementation of the described mechanism, the virtual elements in the 3D scene can be implemented as reflective but non-emitting objects. In this case, the virtual representation of the vehicle has a directional light source at the point of the virtual driver's eye that illuminates the central area of the augmented reality head-up display's field of view. As a result, only the center elements that reflect the light are ever visible, but not the virtual elements located outside the field of view. In this embodiment, it may be provided that the virtual elements are illuminated to different degrees depending on their position. In addition, this variant does not necessarily display complete elements, but in some cases only portions of elements that are located in the light cone.

Figure 12:
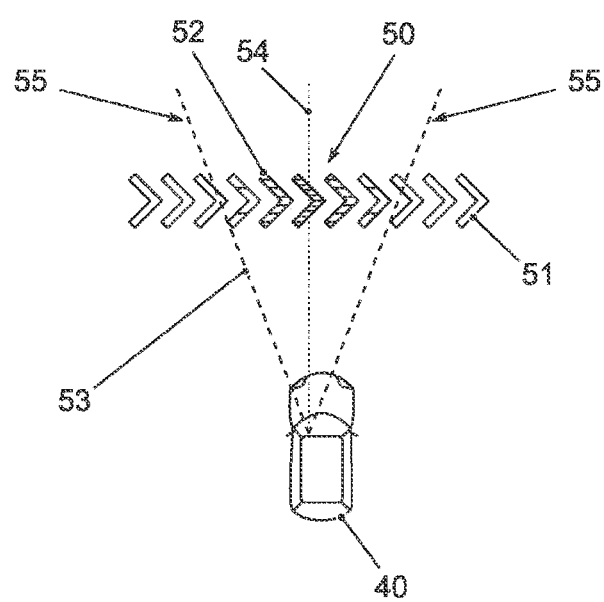
FIG. 12 shows an exemplary contact-analog navigation hint composed of elements rendered with location-dependent brightness.

FIG. 12 shows an example of a contact-analog navigation hint 50 composed of elements 52 rendered with location-dependent brightness. For this purpose, the virtual elements are rendered with decreasing brightness starting from the center 54 of the field of view 53 towards the edges 55 of the field of view 53. This is indicated in FIG. 12 by the density of the hatching.

Figure 13:
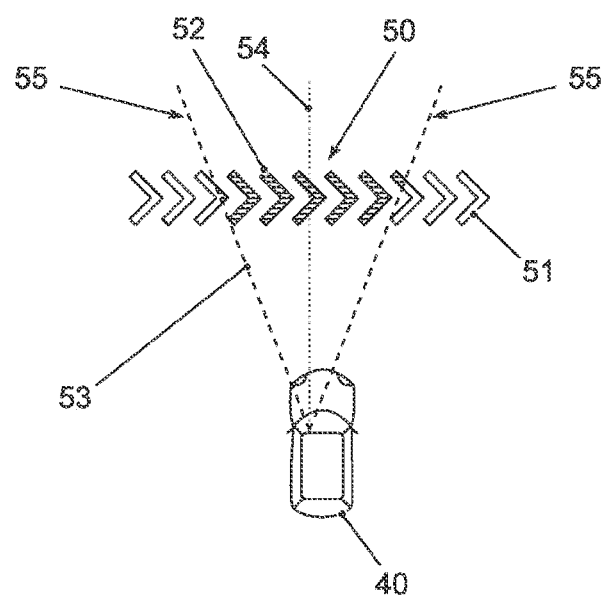
FIG. 13 shows an exemplary contact-analog navigation hint that includes truncated rendered elements.

FIG. 13 shows a contact-analog navigation hint 50 comprising truncated rendered elements 52. While the virtual elements 51 lying in the center 54 of the field of view 53 or adjacent to the center 54 are fully illuminated by the virtual light cone, the virtual elements 51 at the edges 55 of the field of view 53 are only partially illuminated by the virtual light cone. Accordingly, only the parts that are located within the field of view 53 or the parts of these virtual elements 51 illuminated by the virtual light cone are rendered. Again, a location-dependent brightness can be taken into account.

Figure 14:
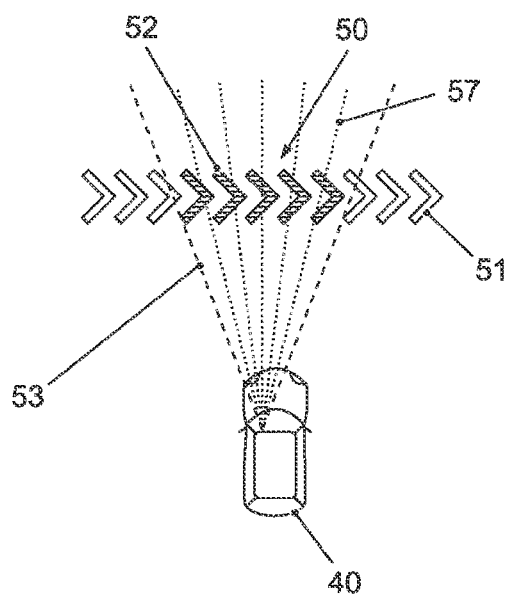
FIG. 14 shows an exemplary generation of a contact-analog navigation hint using raycasting.

In an alternative embodiment, virtual raycasts 57 (visual rays) are sent through the field of view 53 of the augmented reality head-up display at fixed intervals. The generation of a contact-analog navigation hint 50 by raycasting is shown in FIG. 14. When these raycasts 57 encounter virtual elements 51, at these points the corresponding elements are fully displayed as rendered elements 52. This allows for a discrete representation of the display elements. The position of the raycasts 57 can vary with the vehicle position.

The procedure described above refers to the display of the first frame when approaching a turn-off notice. Although the procedure can also be used for each subsequent frame, this leads to a static display in the head-up display when the motor vehicle moves. Augmented reality, however, requires a dynamic adaptation of the display depending on the perspective. This can be achieved by the procedures described below. In both approaches, an augmented reality effect is maintained.

In a first embodiment, once the elements to be displayed have been determined for the first frame, the same elements are displayed in subsequent frames as long as a predefined steering angle is not exceeded. If the steering angle is exceeded, the elements to be rendered are adjusted, since the elements initially defined are likely to move out of the field of view due to the movement of the motor vehicle caused by the steering intervention. Since the same steering angle causes a larger relative position change at a far distance to the virtual elements than at a close distance, a distance-dependent threshold is used for the steering angle changes that lead to the adjustment of the elements to be rendered. This can prevent the elements from wandering back and forth erratically.

In a second embodiment, a check is made at each frame to see if the elements initially specified for the rendering are still in a particular area of the field of view. If there are large lateral changes in the position of the vehicle, the objects move out of this area. If the area is selected so as to be smaller than the entire field of view, this is an indication that the elements will soon move out of the field of view if the position change continues. This information is used to render the next virtual elements that will foreseeably move into the field of view. This ensures that, whenever an element threatens to move out of the field of view, another virtual element is added to compensate for the vehicle movements.

LIST OF REFERENCE NUMERALS

10 Determining a position of the motor vehicle
11 Providing a plurality of virtual elements
12 Rendering at least one virtual element
20 Device
21 Input
22 Position determination module
23 Graphic module
24 Control unit
25 Memory
26 Output
27 User interface
30 Device
31 Memory
32 Processor
33 Input
34 Output
40 Motor vehicle
41 Augmented reality head-up display
42 Augmented reality head-up display control unit
43 Camera
44 Sensor system
45 Navigation system
46 Data transmission unit
47 Assistance system
48 Memory
49 Network
50 Navigation hint
51 Virtual element
52 Rendered element
53 Actual field of view
54 Center of the field of view
55 Edge of the field of view
56 Supposed field of view
57 Raycast
60 Imaging unit
61 Optical module
62 Optical component
63 Projection surface
PS Sensory position
PT Actual position The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for generating a display of an augmented reality head-up display for a motor vehicle, comprising:
   determining a position of the motor vehicle;
   determining a location of a plurality of virtual elements for a navigation direction on the basis of the position of the motor vehicle, wherein the virtual elements, as seen from the motor vehicle, are arranged in a line of virtual elements, wherein the line extends from a field of view of the augmented reality head-up display to outside the field of view of the augmented reality head-up display on a left side and a right side of the field of view;
   determining a center of a field of view of the vehicle; and
   selecting at least one virtual element of the line of virtual elements which has the shortest distance to the center of the field of view; and
   displaying the selected at least one virtual element.

2. The method of claim 1, wherein virtual elements that are adjacent to the virtual element with the shortest distance to the center of the field of view are additionally displayed.

3. The method of claim 2, wherein, for a virtual element that is only partially located within the field of view of the augmented reality head-up display, only the portion of the virtual element that is located within the field of view is displayed.

4. The method of claim 3, wherein the virtual elements are displayed with decreasing brightness starting from the center of the field of view towards edges of the field of view.

5. The method of claim 3, wherein the virtual elements to be displayed are adjusted when a steering angle of the motor vehicle exceeds a threshold value when the position of the motor vehicle is changed.

6. The method of claim 3, wherein the virtual elements to be displayed are adjusted if, when the position of the motor vehicle is changed, at least one already displayed element is no longer located within a predetermined area of the field of view.

7. The method of claim 2, wherein only virtual elements that are entirely located within the field of view of the augmented reality head-up display are displayed.

8. The method of claim 7, wherein the virtual elements are displayed with decreasing brightness starting from the center of the field of view towards edges of the field of view.

9. The method of claim 7, wherein the virtual elements to be displayed are adjusted when a steering angle of the motor vehicle exceeds a threshold value when the position of the motor vehicle is changed.

10. The method of claim 2, wherein the virtual elements are displayed with decreasing brightness starting from the center of the field of view towards edges of the field of view.

11. The method of claim 10, wherein the virtual elements to be displayed are adjusted when a steering angle of the motor vehicle exceeds a threshold value when the position of the motor vehicle is changed.

12. The method of claim 2, wherein the virtual elements to be displayed are adjusted when a steering angle of the motor vehicle exceeds a threshold value when the position of the motor vehicle is changed.

13. The method of claim 2, wherein the virtual elements to be displayed are adjusted if, when the position of the motor vehicle is changed, at least one already displayed element is no longer located within a predetermined area of the field of view.

14. The method of claim 1, wherein the virtual elements to be displayed are adjusted when a steering angle of the motor vehicle exceeds a threshold value when the position of the motor vehicle is changed.

15. The method of claim 14, wherein the steering angle threshold value depends on a distance between the motor vehicle and a display location for the navigation hint.

16. The method of claim 1, wherein the virtual elements to be displayed are adjusted if, when the position of the motor vehicle is changed, at least one already displayed element is no longer located within a predetermined area of the field of view.

17. A non-transitory storage device having instructions that, when executed by a computer, cause the computer to:
   determine a position of the motor vehicle;
   determine a location of a plurality of virtual elements for a navigation direction on the basis of the position of the motor vehicle, wherein the virtual elements, as seen from the motor vehicle, are arranged in a line of virtual elements, wherein the line extends from a field of view of the augmented reality head-up display to outside the field of view of the augmented reality head-up display on a left side and a right side of the field of view;
   determining a center of a field of view of the vehicle;
   selecting at least one virtual element of the line of virtual elements, which has the shortest distance to the center of the field of view; and
   displaying the selected at least one virtual element.

18. A device for generating a display of an augmented reality head-up display for a motor vehicle, comprising:
   a position determination circuit for determining a position of the motor vehicle; and
   a graphics circuit, configured for:
      determining a location of a plurality of virtual elements for a navigation direction on the basis of the position of the motor vehicle, wherein the virtual elements, as seen from the motor vehicle, are arranged in a line of virtual elements, wherein the line extends from a field of view of the augmented reality head-up display to outside the field of view of the augmented reality head-up display on a left side and a right side of the field of view;
      determining a center of a field of view of the vehicle;
      selecting at least one virtual element of the line of virtual elements, which has the shortest distance to the center of the field of view; and
      displaying the selected at least one virtual element.

19. A motor vehicle comprising an augmented reality head-up display, wherein the motor vehicle comprises the device of claim 18.

20. A motor vehicle comprising an augmented reality head-up display, wherein the motor vehicle is configured to:
   determine a position of the motor vehicle;
   determine a location of a plurality of virtual elements for a navigation direction on the basis of the position of the motor vehicle, wherein the virtual elements, as seen from the motor vehicle, are arranged in a line of virtual elements, wherein the line extends from a field of view of the augmented reality head-up display to outside the field of view of the augmented reality head-up display on a left side and a right side of the field of view;

determining a center of a field of view of the vehicle;
selecting at least one virtual element of the line of virtual elements, which has the shortest distance to the center of the field of view; and
displaying the selected at least one virtual element.

\* \* \* \* \*